United States Patent
Maegawa et al.

[11] Patent Number: 5,945,753
[45] Date of Patent: Aug. 31, 1999

[54] MOTOR

[75] Inventors: Hiroaki Maegawa, Machida; Takayuki Tsuboi, Yokohama; Chikara Aoshima, Zama, all of Japan

[73] Assignee: Canon Kabushiki Kaisha, Tokyo, Japan

[21] Appl. No.: 09/027,244

[22] Filed: Feb. 20, 1998

[30] Foreign Application Priority Data

Feb. 21, 1997 [JP] Japan .................................. 9-054201
Jun. 27, 1997 [JP] Japan .................................. 9-187694

[51] Int. Cl.$^6$ ........................... H02K 37/10; H02K 29/06
[52] U.S. Cl. .................. 310/68 B; 310/68 R; 310/49 R; 310/266
[58] Field of Search ................ 310/68 B, 49 R, 310/67 R, 156, 257, 266, 68 C, 68 R

[56] References Cited

U.S. PATENT DOCUMENTS 4,754,183  6/1988  Gerber ................................ 310/49 R
5,384,506  1/1995  Aoshima ................................ 310/49
5,831,356  11/1998  Aoshima ................................ 310/49

Primary Examiner—Thomas M. Dougherty
Assistant Examiner—Burt Mullins
Attorney, Agent, or Firm—Fitzpatrick, Cella, Harper & Scinto

[57] ABSTRACT

In a motor, a rotor made of a permanent magnet which is equally divided in the circumferential direction to be alternately magnetized to different poles is formed into a cylindrical shape. The first coil, the rotor, and the second coil are sequentially arranged in the axial direction of the rotor. The first outer and inner magnetic poles excited by the first coil are set to oppose the outer and inner circumferential surfaces, respectively, of the rotor, and the second outer and inner magnetic poles excited by the second coil are set to oppose the outer and inner circumferential surfaces, respectively, of the rotor. An electric element is arranged at a position to oppose, across a predetermined gap, the circumferential surface of the permanent magnet not covered with the first or second outer magnetic pole. Alternatively, an electric element and a circuit pattern are formed on a connection member that connects the first and second outer magnetic poles to each other.

26 Claims, 14 Drawing Sheets

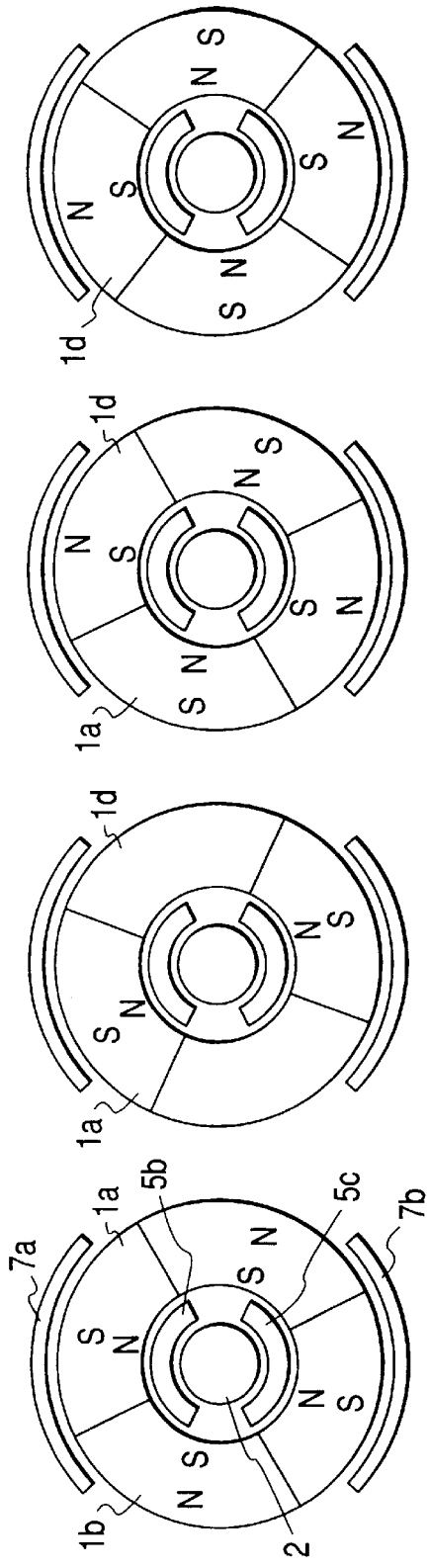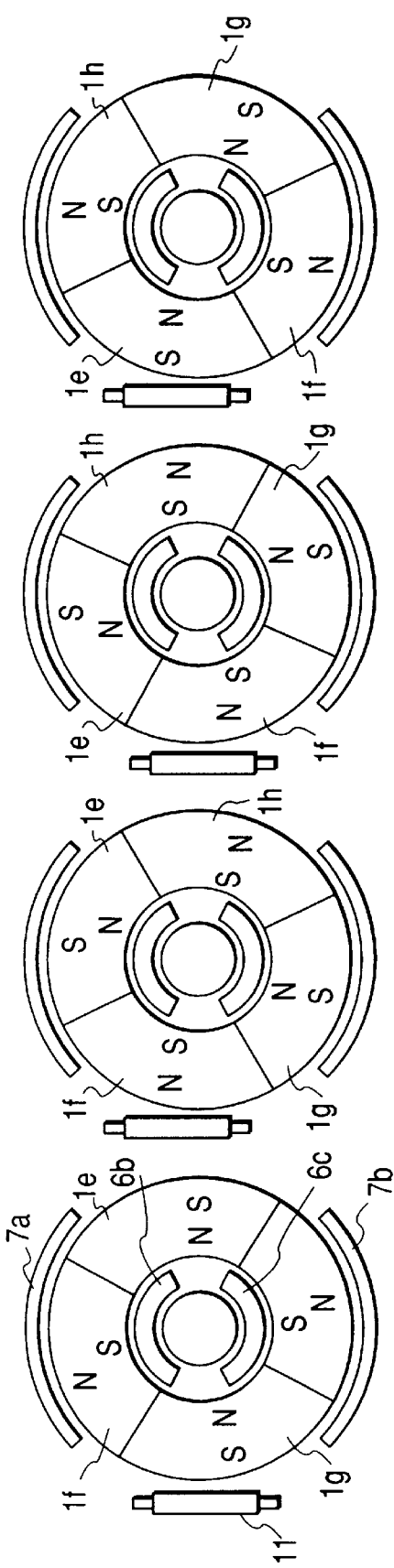

MOTOR

BACKGROUND OF THE INVENTION

1. Field of the Invention

The present invention relates to a motor which has an electric element and a driving circuit and which can be made very compact.

2. Related Background Art

As a conventional compact motor, for example, a compact cylindrical stepping motor shown in FIG. 20 is available. A stator coil 105 is concentrically wound on each bobbin 101. The bobbin 101 is sandwiched and fixed by two stator yokes 106 in the axial direction. Stator teeth 106a and 106b are alternately arranged in each stator yoke 106 in the circumferential direction of the inner-diameter surface of the bobbin 101. The stator yoke 106, which is integral with the stator teeth 106a or 106b, is fixed to a case 103, thus constituting each stator 102.

A flange 115 and a bearing 108 are fixed on one of the two cases 103, and the other bearing 108 is fixed to the other case 103. A rotor 109 is constituted by a rotor magnet 111 fixed to a rotor shaft 110. The rotor magnet 111 forms a radial gap portion together with the stator yokes 106 of the stators 102. The rotor shaft 110 is rotatably supported between the two bearings 108.

In the conventional compact stepping motor described above, however, since the cases 103, the bobbins 101, the stator coils 105, the stator yokes 106, and the like are concentrically arranged around the rotor 109, the outer size of the motor is undesirably increased. This stepping motor must have a rotary encoder or the like to perform position detection and to form a brushless motor, leading to a further increase in motor size. Since the magnetic flux generated by energization of the stator coils 105 mainly passes through an end face 106a1 of the stator tooth 106a and an end face 106b1 of the stator tooth 106b, as shown in FIG. 21, it does not effectively act on the rotor magnet 111. Therefore, the motor output is not increased.

The present applicant proposes a motor free from these problems in U.S. patent application Ser. No. 08/831,863.

In this motor, a rotor made of a permanent magnet, which is equally divided in the circumferential direction to be alternately magnetized to different poles, is formed into a cylindrical shape. The first coil, the rotor, and the second coil are sequentially arranged in the axial direction of the rotor. The first outer and inner magnetic poles excited by the first coil are set to oppose the outer and inner circumferential surfaces, respectively, of the rotor, and the second outer and inner magnetic poles excited by the second coil are set to oppose the outer and inner circumferential surfaces, respectively, of the rotor. A rotating shaft serving as the rotor shaft extends from the inside of the cylindrical permanent magnet.

The motor having the above arrangement has a high output and its outer size can be made small. However, since the inner magnetic poles have small diameters, it is difficult to machine their magnetic pole teeth. And, since the rotating shaft extending from the inside of the cylindrical permanent magnet also has a small diameter, it is difficult to machine the rotor having the rotating shaft.

For these reasons, recently, the present applicant has proposed a motor, in which the inner magnetic poles have shapes that can be machined well, in U.S. patent application Ser. No. 08/994,994, and a motor, in which a rotor having a rotating shaft can be machined easily, in U.S. Patent Application the serial number of which is not yet assigned. However, demand has arisen for a motor in which an electric element and a driving circuit used for position detection can be mounted easily while keeping the diameter small.

SUMMARY OF THE INVENTION

The present invention has been made in view of the above situation, and has as its object to provide a motor which integrally has a position detection means and which can be made very compact.

It is another object of the present invention to mount a motor driving circuit on a motor side surface portion.

The above and other objects, features, and advantages of the present invention will be apparent from the detailed description of the following preferred embodiments taken in conjunction with the accompanying drawings.

BRIEF DESCRIPTION OF THE DRAWINGS

FIGS. 3A, 3B, 3C, 3D, 3E, 3F, 3G and 3H are views for explaining the rotating operation of the rotor of the motor shown in FIG. 2;

FIGS. 12A and 12B show the third embodiment of the present invention, in which FIG. 12A is a front view of the motor, and FIG. 12B is a plan view of the motor;

FIGS. 13A and 13B show the fourth embodiment of the present invention, in which FIG. 13A is a front view of the motor, and FIG. 13B is a plan view of the motor;

FIGS. 14A and 14B show the fifth embodiment of the present invention, in which FIG. 14A is a front view of the motor, and FIG. 14B is a plan view of the motor;

DETAILED DESCRIPTION OF THE PREFERRED EMBODIMENTS

Figure 1:
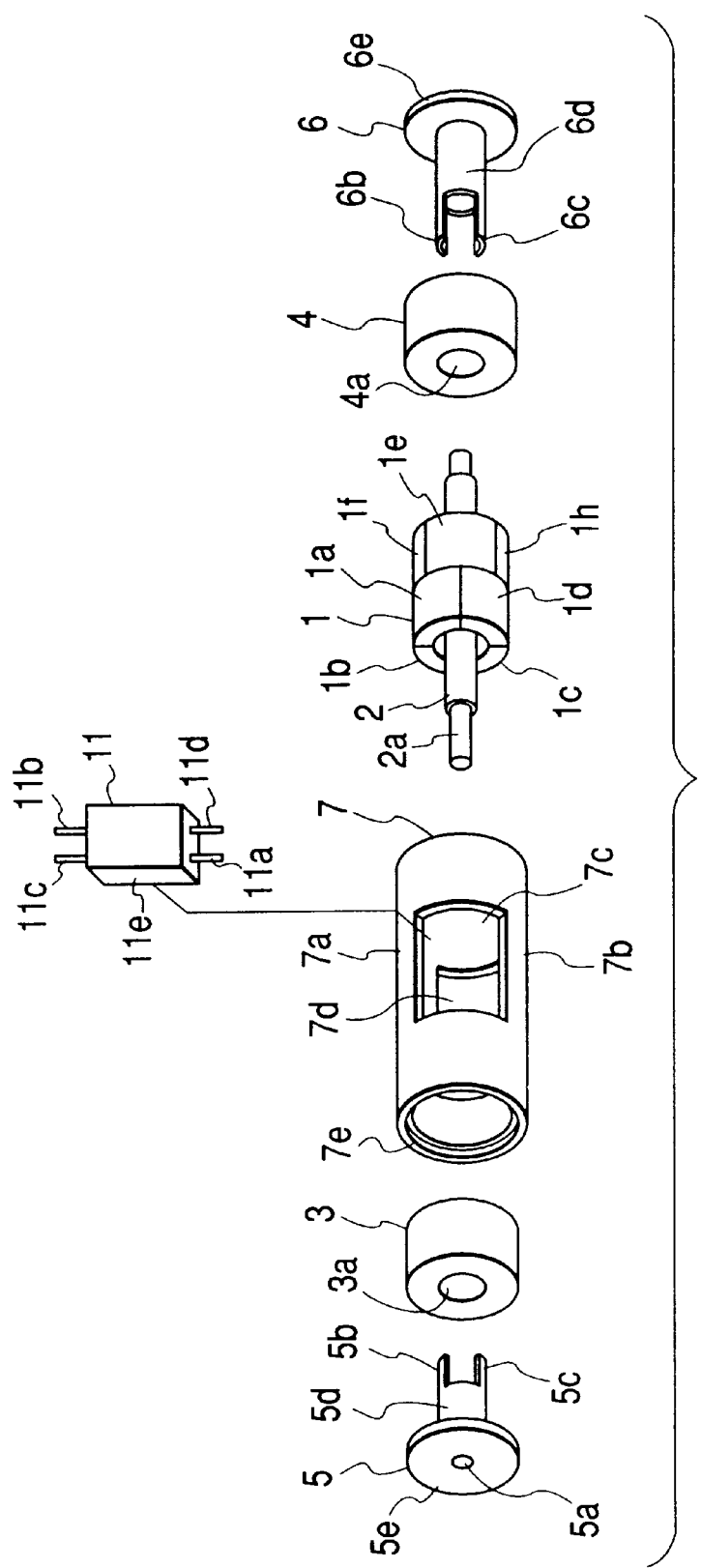
FIG. 1 is an exploded perspective view of a motor according to the first embodiment of the present invention.

The preferred embodiments of the present invention will be described with reference to the accompanying drawings.

(First Embodiment)

FIGS. 1 and 2, and FIGS. 3A to 3H show the first embodiment of the present invention. A magnet ring 1 is made of a cylindrical permanent magnet. The magnet ring 1 is constituted by a first magnetized layer consisting of portions 1a, 1b, 1c, and 1d formed by dividing the magnet ring 1 into n portions (4 portions in this embodiment) in the circumferential direction alternately magnetized to S and N poles, and a second magnetized layer consisting of portions 1e, 1f, 1g, and 1h similarly formed by dividing the magnet ring 1 into 4 portions in the circumferential direction alternately magnetized to S and N poles. The first magnetized layer and the second magnetized layer are phase-shifted from each other by 180/n°, i.e., 45°.

In this embodiment, the portions 1a and 1c of the first magnetized layer and the portions 1e and 1g of the second magnetized layer are magnetized such that their outer and inner circumferential surfaces become S and N poles, respectively. The portions 1b and 1d of the first magnetized layer and the portions 1f and 1h of the second magnetized layer are magnetized such that their outer and inner circumferential surfaces become N and S poles, respectively.

The magnet ring 1 is fixed on a rotating shaft 2. The rotating shaft 2 and the magnet ring 1 constitute a rotor. Coils 3 and 4 are concentric with the magnet ring 1 and are arranged at positions that sandwich the magnet ring 1 in the axial direction. A first yoke 5 is made of a soft magnetic material. The first yoke 5 has a portion 5d to be inserted in an inner-diameter portion 3a of the coil 3, and teeth 5b and 5c opposing the inner-diameter portion of the first magnetized layer of the magnet ring 1. The teeth 5b and 5c are formed to be phase-shifted from each other by $360/(n/2)°$, i.e., 180°, so that they have the same phase as that of the poles of the first magnetized layer. A hole 5a of the first yoke 5 and a portion 2a of the rotating shaft 2 rotatably fit with each other.

A second yoke 6 is made of a soft magnetic material. The second yoke 6 has a portion 6d to be inserted in an inner-diameter portion 4a of the coil 4, and teeth 6b and 6c opposing the inner-diameter portion of the second magnetized layer of the magnet ring 1. The teeth 6b and 6c are formed to be phase-shifted from each other by $360/(n/2)°$, i.e., 180°, so that they have the same phase as that of the poles of the second magnetized layer. A hole 6a of the second yoke 6 and a portion 2b of the rotating shaft 2 rotatably fit with each other. The teeth 5b and 5c of the first yoke 5 and the teeth 6b and 6c of the second yoke 6 have the same phase, i.e., they are located at positions to oppose each other in the axial direction.

A third yoke 7 is made of a soft magnetic material. The third yoke 7 has a cylindrical shape, and is constituted to cover the outer circumferences of the coils 3 and 4 and magnet ring 1. The third yoke 7 is connected to a portion 5e of the first yoke 5 with its portion 7e, and is connected to a portion 6e of the second yoke 6 with its portion 7f. The third yoke 7 has portions 7a and 7b opposing the teeth 5b and 5c of the first yoke 5 and the teeth 6b and 6c of the second yoke 6 through the magnet ring 1. Holes 7c and 7d are formed in the remaining portion of the third yoke 7. Since the teeth 5b and 5c of the first yoke 5 and the teeth 6b and 6c of the second yoke 6 have the same phase, the magnetic pole portions 7a and 7b of the third yoke 7 that should oppose the teeth 5b and 5c, and 6b and 6c have simple shapes, as shown in FIG. 1, so that they can be easily manufactured by pressing or the like.

A Hall element 11 is constituted by a Vcc power supply terminal 11a, a GND terminal 11b, an output (+) terminal 11c, an output (−) terminal 11d, and a sensitive surface 11e. The sensitive surface 11e of the Hall element 11 opposes the circumference of the portions 1e, 1f, 1g, and 1h of the second magnetized layer of the magnet ring 1 at with a predetermined gap therebetween, forms a vertical surface extending toward the center of the rotating shaft 2, and is arranged in the hole 7c of the third yoke 7. At this position, the Hall element 11 is adhered and fixed to the third yoke 7, so that its projection to the outside of the motor outer-shape portion can be minimized.

Figure 2:
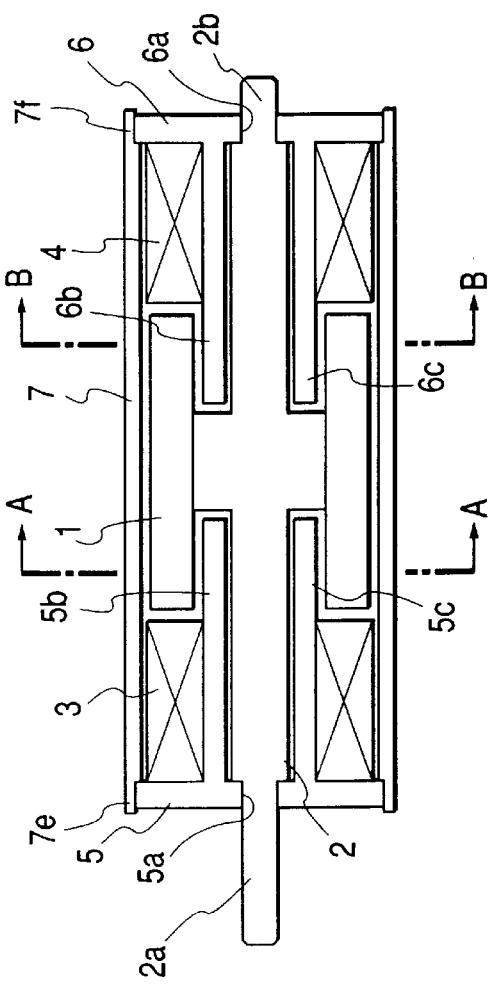
FIG. 2 is a sectional view of the motor shown in FIG. 1 in an assembled state.

FIG. 2 is a sectional view after assembly. Each of FIGS. 3A, 3B, 3C, and 3D shows a section taken along the line A—A of FIG. 2, and each of FIGS. 3E, 3F, 3G, and 3H shows a section taken along the line B—B of FIG. 2. FIGS. 3A and 3E are sectional views taken at the same time point, FIGS. 3B and 3F are sectional views taken at the same time point, FIGS. 3C and 3G are sectional views taken at the same point, and FIGS. 3D and 3H are sectional views taken at the same time point.

From the state shown in FIGS. 3A and 3E, the coils 3 and 4 are energized to excite the teeth 5b and 5c of the first yoke 5 to S poles; sub-portions of the portions 7a and 7b of the third yoke 7 that oppose the teeth 5b and 5c, to N poles; the teeth 6b and 6c of the second yoke 6, to S poles; and other sub-portions of the portions 7a and 7b of the third yoke 7 that oppose the teeth 6b and 6c, to N poles. Then, the magnet ring 1 is rotated to the left (counterclockwise) through 45° to realize the state shown in FIGS. 3B and 3F.

Energization to the coil 3 is inverted, and the teeth 5b and 5c of the first yoke 5 are excited to N poles, the sub-portions of the portions 7a and 7b of the third yoke 7 that oppose the teeth 5b and 5c are excited to S poles, the teeth 6b and 6c of the second yoke 6 are excited to S poles, and the sub-portions of the portions 7a and 7b of the third yoke 7 that oppose the teeth 6b and 6c are excited to N poles. Then, the magnet ring 1 is further rotated to the left through 45° to realize the state shown in FIGS. 3C and 3G.

Subsequently, energization to the coil 4 is inverted, and the teeth 6b and 6c of the second yoke 6 are excited to N poles, and the sub-portions of the portions 7a and 7b of the third yoke 7 that oppose the teeth 6b and 6c are excited to S poles. Then, the magnet ring 1 is further rotated to the left through 45°.

In this manner, when the direction of energization to the coils 3 and 4 is sequentially switched, the rotor constituted by the magnet ring 1 and the rotating shaft 2 are sequentially rotated to positions corresponding to the energization phases.

Simultaneously, if the Hall element is constituted by a known electric circuit, a change in the Hall signal is detected in accordance with a change in the rotating position of the second magnetized layer shown in FIGS. 3E, 3F, 3G, and 3H described above, i.e., in accordance with a change in the rotating position of the rotor. Since no yoke exists near the Hall element, the Hall element is not substantially influenced by a magnetic field generated by the coils but reacts against only a magnetic field from the magnet ring 1, so that the rotating position of the rotor can be detected highly precisely.

(Second Embodiment)

Figure 4:
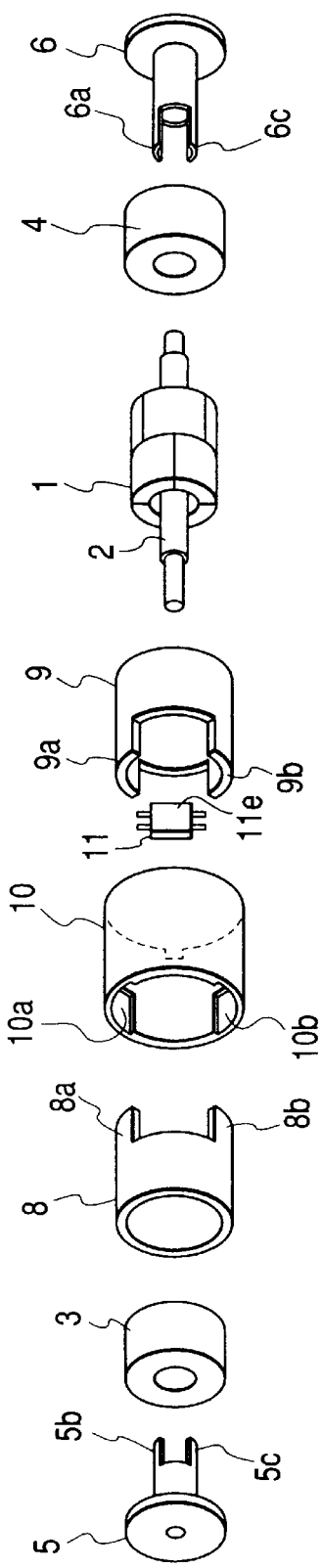
FIG. 4 is an exploded perspective view of a motor according to the second embodiment of the present invention.
Figure 5:
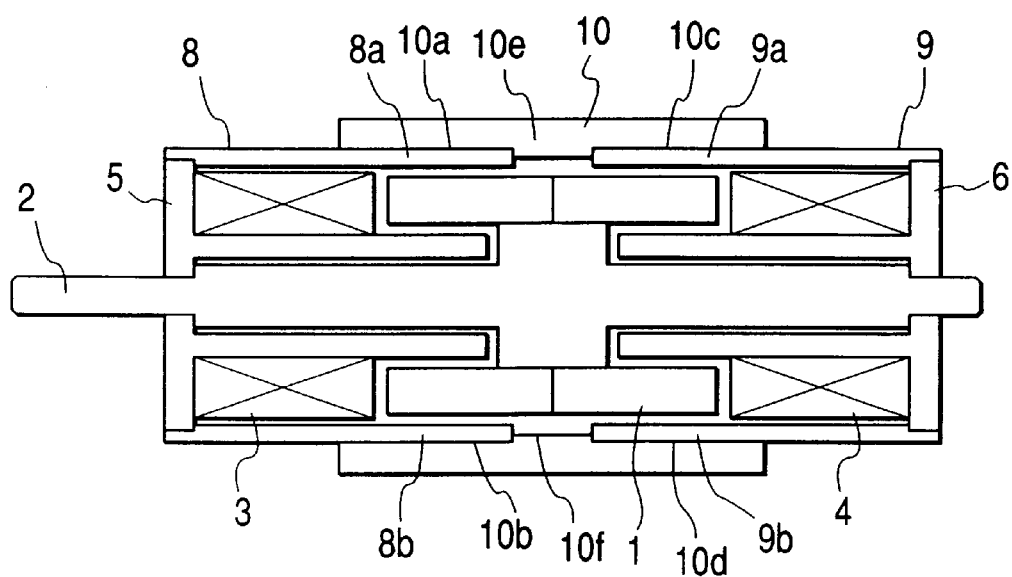
FIG. 5 is a sectional view of the motor shown in FIG. 4 in an assembled state.

FIGS. 4 and 5 show the second embodiment of the present invention. A first outer yoke 8 is made of a soft magnetic material. Teeth 8a and 8b of the first outer yoke 8 are formed at positions to sandwich the first magnetized layer of a magnet ring 1 with teeth 5b and 5c of a first yoke 5. A second outer yoke 9 is made of a soft magnetic material. Teeth 9a and 9b of the second outer yoke 8 are formed at positions to sandwich the second magnetized layer of the magnet ring 1 with teeth 6b and 6c of a second yoke 6.

A connection ring 10 is made of a nonmagnetic material. The teeth 8a and 8b of the first outer yoke 8 are fitted in grooves 10a and 10b, respectively, of the connection ring 10, and the teeth 9a and 9b of the second outer yoke 9 are fitted in grooves 10c and 10d, respectively, of the connection ring 10. The first outer yoke 8 and the second outer yoke 9 are fixed with a known method, e.g., by adhesion. The first outer yoke 8 and the second outer yoke 8 are fixed to each other at a predetermined gap through portions 10e and 10f of the connection ring 10. The teeth 8a and 8b of the first outer yoke 8 are arranged to oppose the teeth 9a and 9b of the second outer yoke 9. The first outer yoke 8 and the second outer yoke 9 serve in the same manner as the third yoke of the first embodiment does.

As shown in FIG. 5, one end of the first outer yoke 8 is connected to the first yoke 5 and covers the outer-diameter portion of the coil 3, and the teeth 8a and 8b constituting the other end of the first outer yoke 8 oppose the outer circumferential portion of the magnet ring 1 with a predetermined gap therebetween. As shown in FIG. 5, one end of the second outer yoke 9 is connected to the second yoke 6 and covers the outer-diameter portion of a coil 4, and the teeth 9a and 9b constituting the other end of the second outer yoke 9 oppose the outer circumferential portion of the magnet ring 1 with a predetermined gap therebetween.

In the same manner as in the first embodiment, a sensitive surface 11e of a Hall element 11 opposes the circumference of the magnet ring with a predetermined gap therebetween, forms a vertical surface extending toward the center of the rotating shaft, and is arranged between the teeth 9a and 9b of the second outer yoke 9. At this position, the Hall element 11 is adhered and fixed to the connection ring 10, so that its projection to the outside of the motor outer-shape portion can be minimized.

Figure 7:
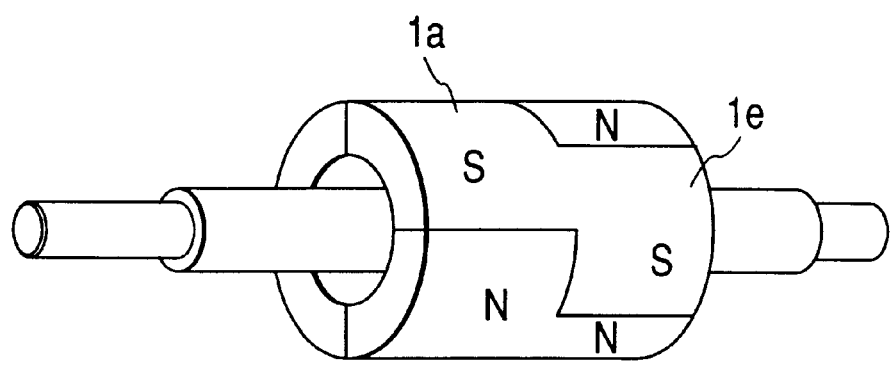
FIG. 7 is an enlarged view of the rotor shown in FIG. 4.
Figure 8A:
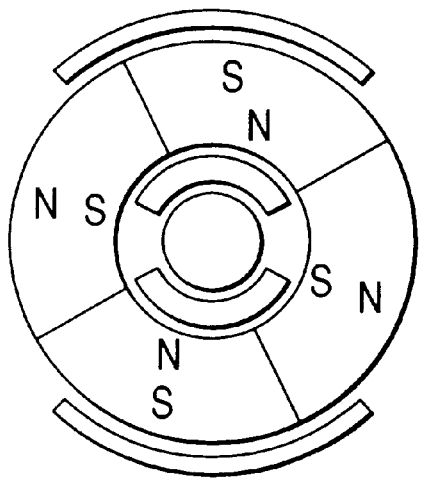
FIGS. 8A and 8B are views showing the first state of the rotor with respect to the yoke of the motor shown in FIG. 5.
Figure 8B:
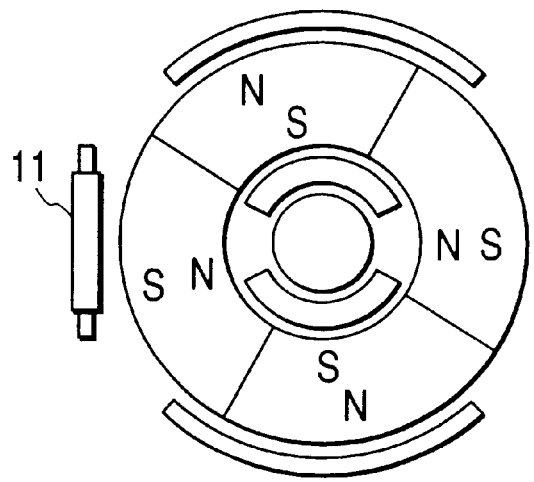
Figure 9A:
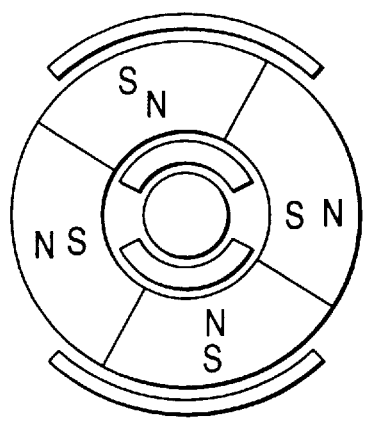
FIGS. 9A and 9B are views showing the second state of the rotor shown in FIGS. 8A and 8B.
Figure 9B:
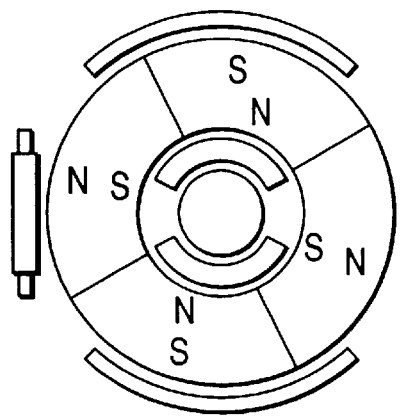
Figure 10A:
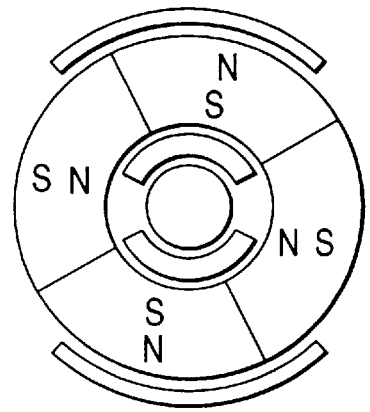
FIGS. 10A and 10B are views showing the third state of the rotor shown in FIGS. 8A and 8B.
Figure 10B:
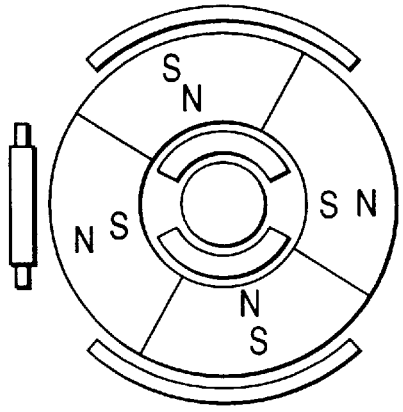
Figure 11A:
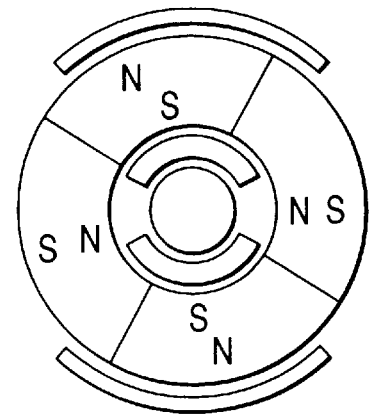
FIGS. 11A and 11B are views showing the fourth state of the rotor shown in FIGS. 8A and 8B.
Figure 11B:
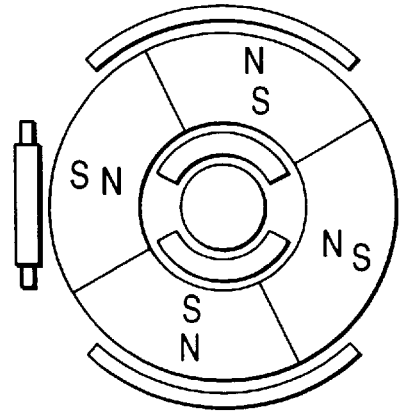

FIG. 7 is an enlarged view of the rotor. FIGS. 8A and 8B, 9A and 9B, 10A and 10B, and 11A and 11B show the rotating phases of the magnet ring, in which FIGS. 8A, 9A, 10A, and 11A show the first magnetized layer, and FIGS. 8B, 9B, 10B, and 11B show the second magnetized layer.

Figure 6:
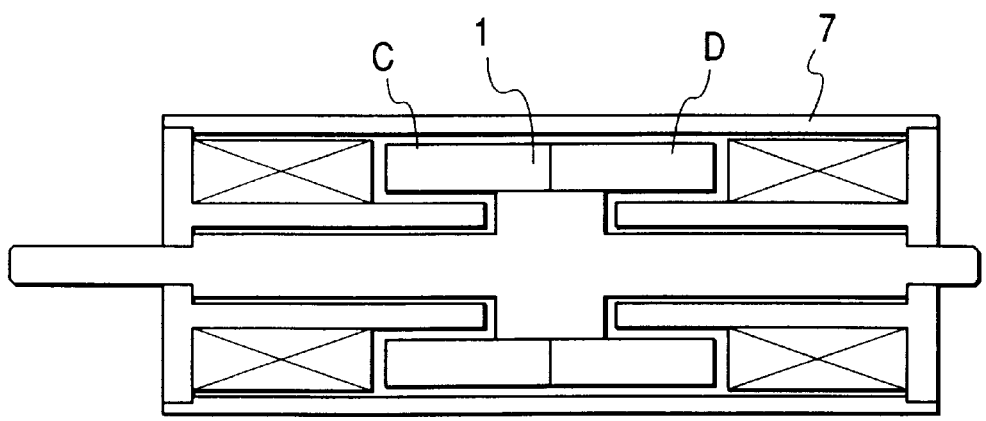
FIG. 6 is a view for explaining the motor shown in FIG. 2.

If a third yoke 7 is formed integrally, as in the first embodiment shown in FIG. 6, a magnetic flux travels between a first magnetized layer C and a second magnetized layer D of the magnet ring 1 through the third yoke 7. When the magnet ring 1 is at the rotating position shown in FIGS. 8A and 8B, and 10A and 10B, a force caused by cogging becomes larger than in the cases shown in FIGS. 9A and 9B and FIGS. 11A and 11B. Cogging occurs strongly four times at a 90° pitch during one revolution. When energization to a coil 3 and the coil 4 is sequentially alternated, eight alternating operations rotate the motor during one revolution. Therefore, an electromagnetic force generated by energization to the coils 3 and 4 and the force caused by cogging do not always coincide with each other. As a result, the fluctuation in generated drive force is large and the rotation is not smooth.

In this embodiment, since the connection ring 10 is made of a nonmagnetic material, it magnetically insulates the first outer yoke 8 and second outer yoke 9 from each other, so that substantially no magnetic flux travels between the first and second magnetized layers through the first and second outer yokes 8 and 9. Also, cogging is caused four times at a 90° pitch by the first magnetized layer and another four times at a 90° pitch, which is phase-shifted from the former cogging by 45°, by the second magnetized layer, so that cogging occurs a total of eight times. Since cogging occurs at a 45° pitch, the fluctuation in generated drive force is small, thus providing a motor which rotates smoothly.

When the Hall element is constituted with a known electric circuit, a change in the Hall signal is detected in accordance with a change in rotating position of the rotor, in the same manner as in the first embodiment. Since no yoke exists near the Hall element, the Hall element is not substantially influenced by a magnetic field generated by the coils but reacts against only a magnetic field from the magnet ring 1, so that the rotating position of the rotor can be detected highly precisely.

(Third Embodiment)

Figure 12A:
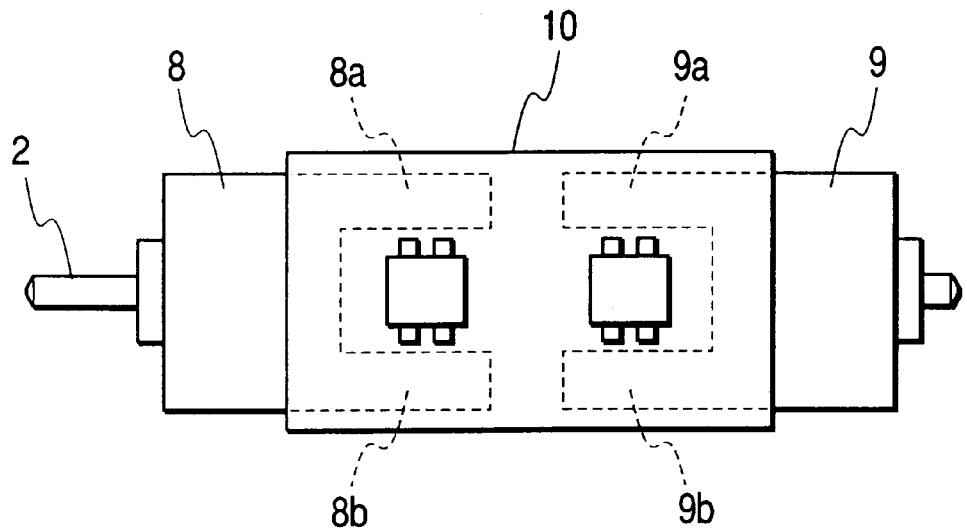
Figure 12B:
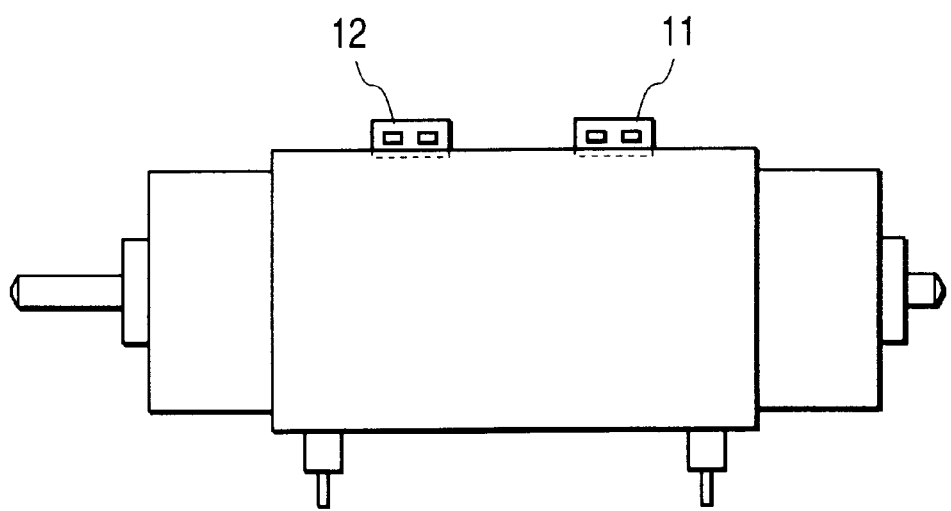

FIGS. 12A and 12B show the third embodiment, in which FIG. 12A is a plan view after assembly and FIG. 12B is a front view after assembly. The basic arrangement of the third embodiment is the same as that of the second embodiment. In the same manner as in the second embodiment, a second Hall element 12 is arranged between teeth 8a and 8b of a first outer yoke 8, and is adhered and fixed to a connection ring 10. When two Hall elements arranged side by side in this manner are constituted by known electric circuits, a Hall signal can be detected in accordance with a change in the rotating position of the rotor highly precisely with a higher resolution than in the second embodiment. The arrangement in which two Hall elements are arranged side by side can be similarly applied to the first embodiment.

(Fourth Embodiment)

Figure 13A:
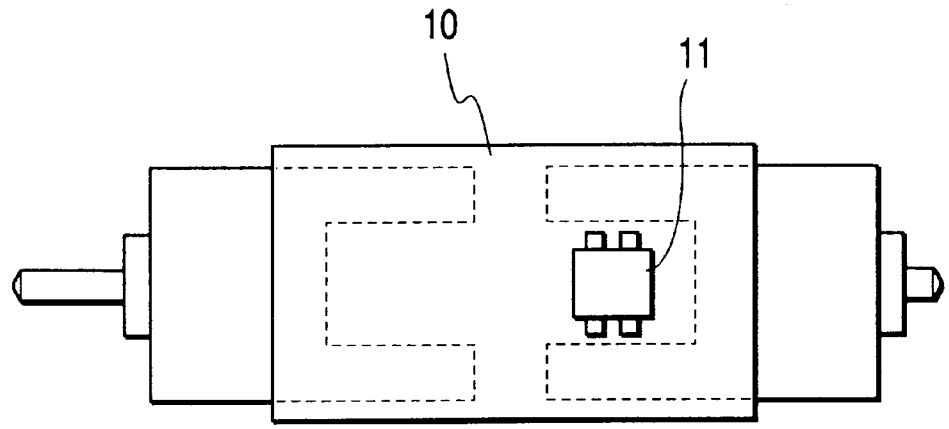
Figure 13B:
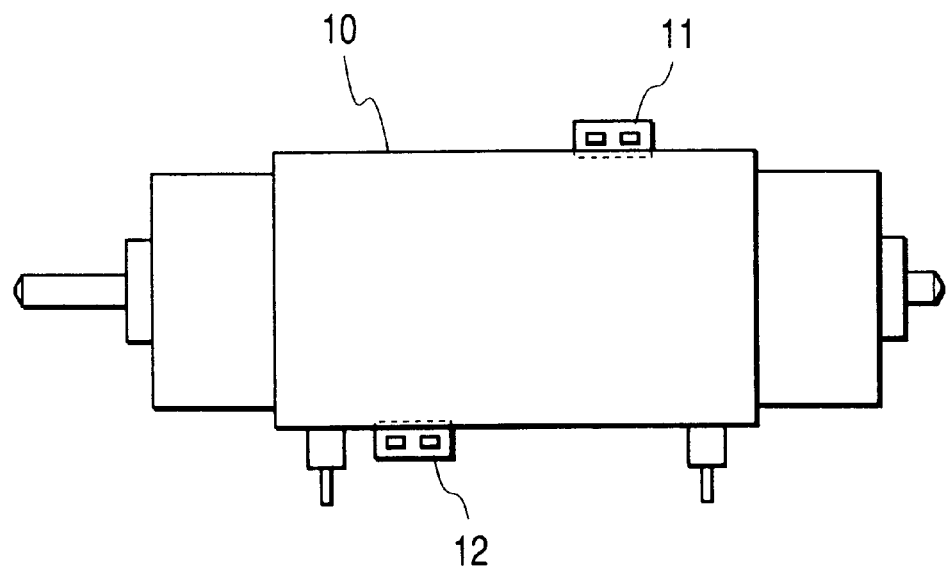

FIGS. 13A and 13B show the fourth embodiment, in which FIG. 13A is a plan view after assembly and FIG. 13B is a front view after assembly. The basic arrangement of the fourth embodiment is the same as that of the second embodiment. A second Hall element 12 is arranged, between teeth 8a and 8b of a first outer yoke 8, at a position opposing the position of the second Hall element 12 in the third embodiment at 180°, and is adhered and fixed to a connection ring 10. The two Hall elements arranged in this manner are constituted by known electric circuits, and the resultant Hall signal can be obtained at high precision, in the same manner as in the third embodiment. The arrangement in which the first and second Hall elements are arranged on corners opposing each other through 180° about the rotor shaft as the center can be similarly applied to the first embodiment.

(Fifth Embodiment)

Figure 14A:
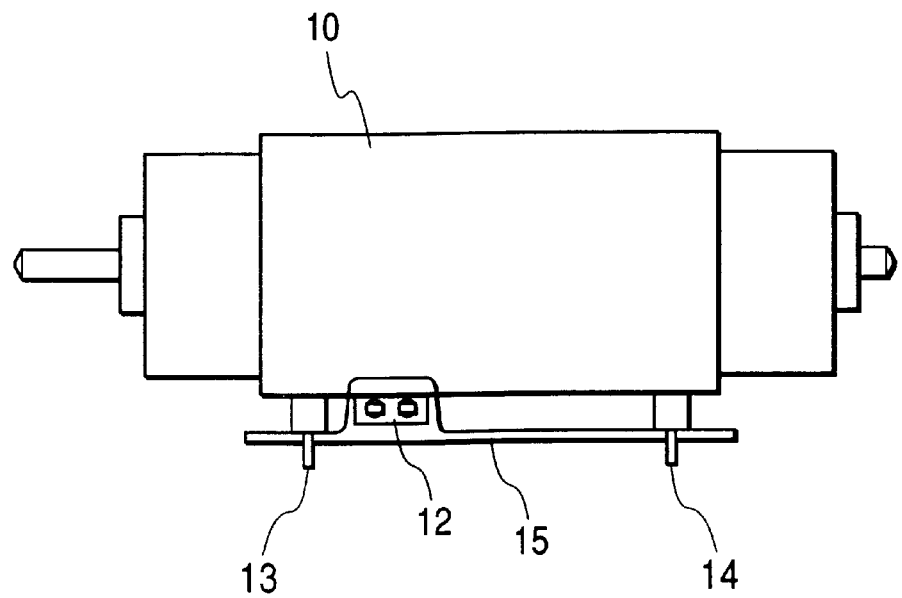
Figure 14B:
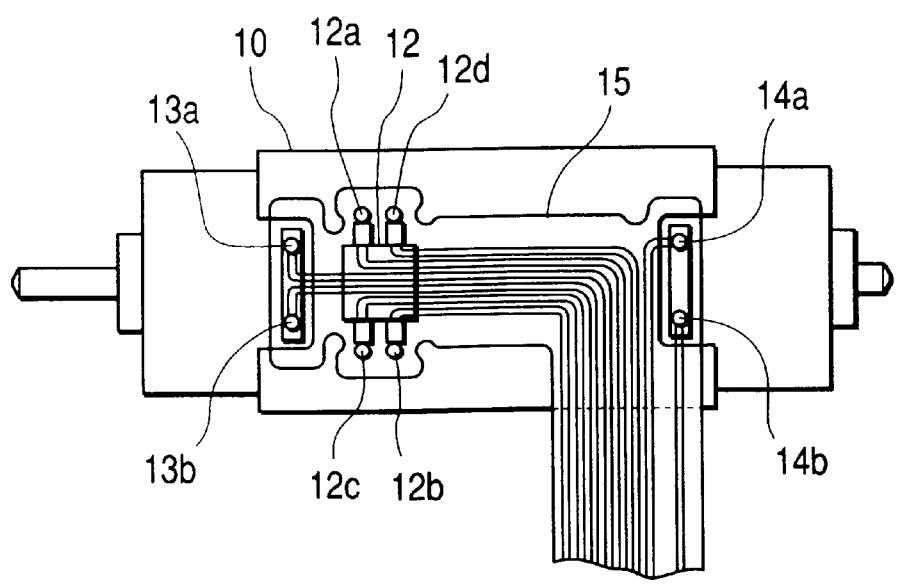

FIGS. 14A and 14B show the fifth embodiment, in which FIG. 14A is a front view and FIG. 14B is a rear view after assembly. The basic arrangement of the fifth embodiment is the same as that of the second embodiment and includes a Hall element 12, coil terminals 13a and 13b of a coil 3 identical to that of the second embodiment, coil terminals 14a and 14b of a coil 4 identical to that of the second embodiment, and a mounting flexible printed circuit board 15. The mounting flexible printed circuit board 15 has a pattern (not shown) for connecting the pattern of the coil terminals 13a, 13b, 14a, and 14b and a known motor driver circuit to each other, and a pattern (not shown) for connecting the pattern of the second Hall element 12 and a Hall signal detection circuit to each other.

As shown in FIG. 14A, the mounting flexible printed circuit board 15 is placed along a connection ring 10, and the Hall element 12 is accommodated between coil terminals 13 and 14 to be lower than their projection. When the coil terminals 13 and 14 and terminals 12a, 12b, 12c, and 12d of the Hall element 12 are set close to each other, the width of the mounting flexible printed circuit board 15 can be minimized.

(Sixth Embodiment)

Figure 15:
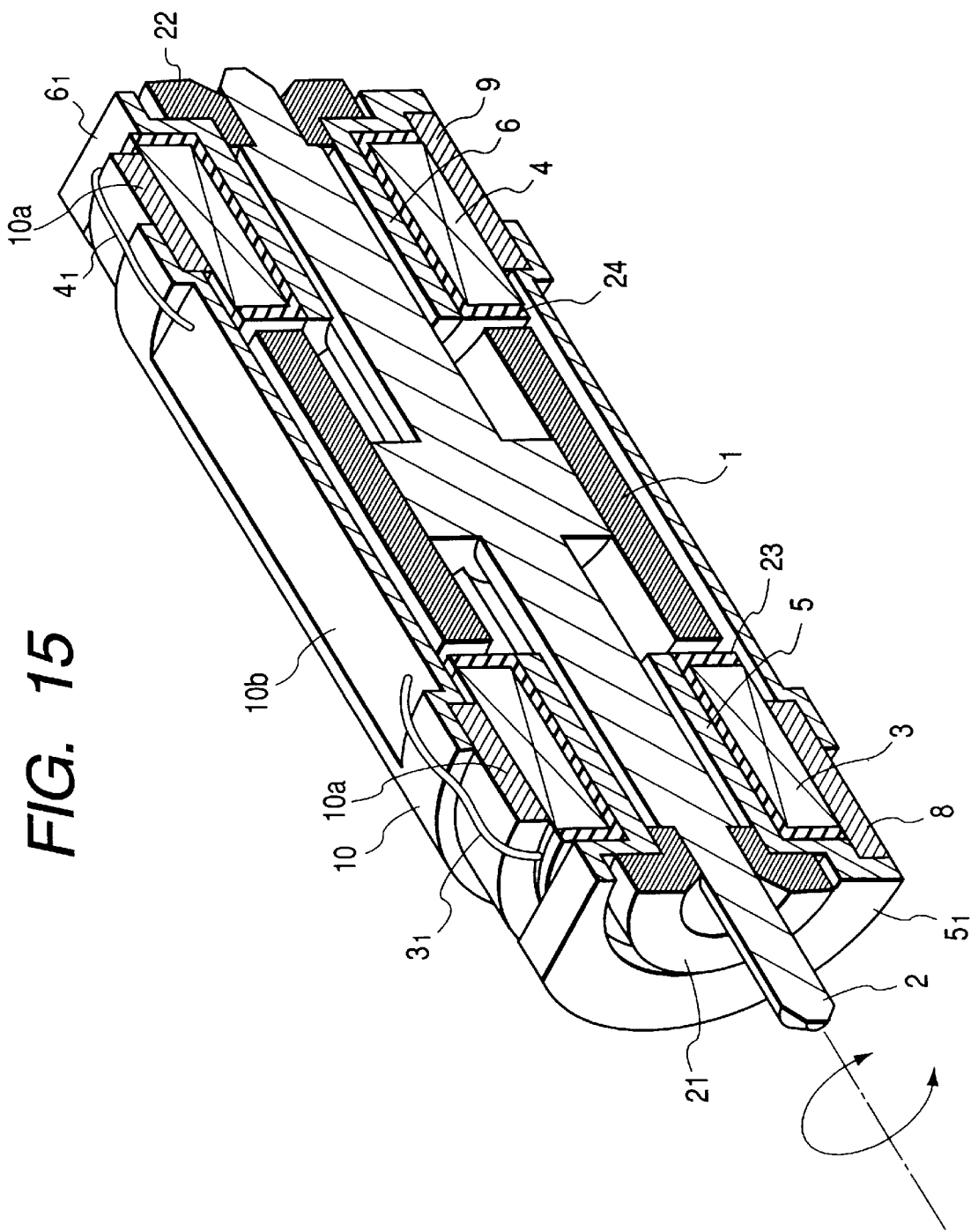
FIG. 15 is a sectional view of a motor according to the sixth embodiment of the present invention.

FIG. 15 show a motor according to the sixth embodiment of the present invention. Referring to FIG. 15, a magnet ring 1 is made of a cylindrical permanent magnet. The magnet ring 1 is constituted by a first magnetized layer formed by dividing the magnet ring 1 into n portions (4 portions in this embodiment) in the circumferential direction, alternately magnetized to S and N poles, and a second magnetized layer formed by dividing the magnet ring 1 into 4 portions in the circumferential direction, alternately magnetized to S and N poles. The first magnetized layer and the second magnetized layer are phase-shifted from each other by 180/n°, i.e., 45°.

A rotating shaft 2 is pivotally supported by metal guides 21 and 22. The magnet ring 1 is fixed to the rotating shaft 2. The rotating shaft 2 and the magnet ring 1 constitute a rotor. Coils 3 and 4 are wound on bobbins 23 and 24, respectively. The coils 3 and 4 are concentric with the magnet ring 1 and are arranged at such positions that sandwich the magnet ring 1 in the axial direction. Terminal portions $3_1$ and $4_1$ of the coils 3 and 4 are soldered or laser-welded to a mounting substrate (to be described later). A first yoke 5 is made of a soft magnetic material. The first yoke 5 is inserted in the inner-diameter portion of the coil 3 and has magnetic pole teeth that oppose the inner-diameter portion of the first magnetized layer of the magnet ring 1. The metal guide 21 is pressed into a flange portion $5_1$ of the first yoke 5. A second yoke 6 is made of a soft magnetic material. The second yoke 6 is inserted in the inner-diameter portion of the coil 4 and has magnetic pole teeth that oppose the inner-diameter portion of the second magnetic layer of the magnet ring 1. The metal guide 22 is pressed into a flange portion $6_1$ of the second yoke 6. A first outer yoke 8 is made of a soft magnetic material. The magnetic pole teeth of the first outer yoke 8 are formed at positions to sandwich the first magnetized layer of the magnet ring 1 with the magnetic pole teeth of the first yoke 5. A second outer yoke 9 is made of a soft magnetic material. The magnetic pole teeth of the second outer yoke 9 are formed at positions to sandwich the second magnetized layer of the magnet ring 1 with the magnetic pole teeth of the second yoke 6.

A connection ring 10 connects the first outer yoke 8 and the second outer yoke 9 to each other. The connection ring 10 is made of a so-called heat-resistant super engineering plastic, e.g., a liquid crystal polymer or polyether imide. A circuit pattern constituted by M.I.D. is formed on the surface of the connection ring 10 with a known method. Guide portions 10a of the connection ring 10 are fitted in the first and second outer yokes 8 and 9 described above by press fitting. The connection ring 10 has two flat portions 10b on its circumference where the first and second outer yokes 8 and 9 do not extend to the magnet ring 1.

Figure 16:
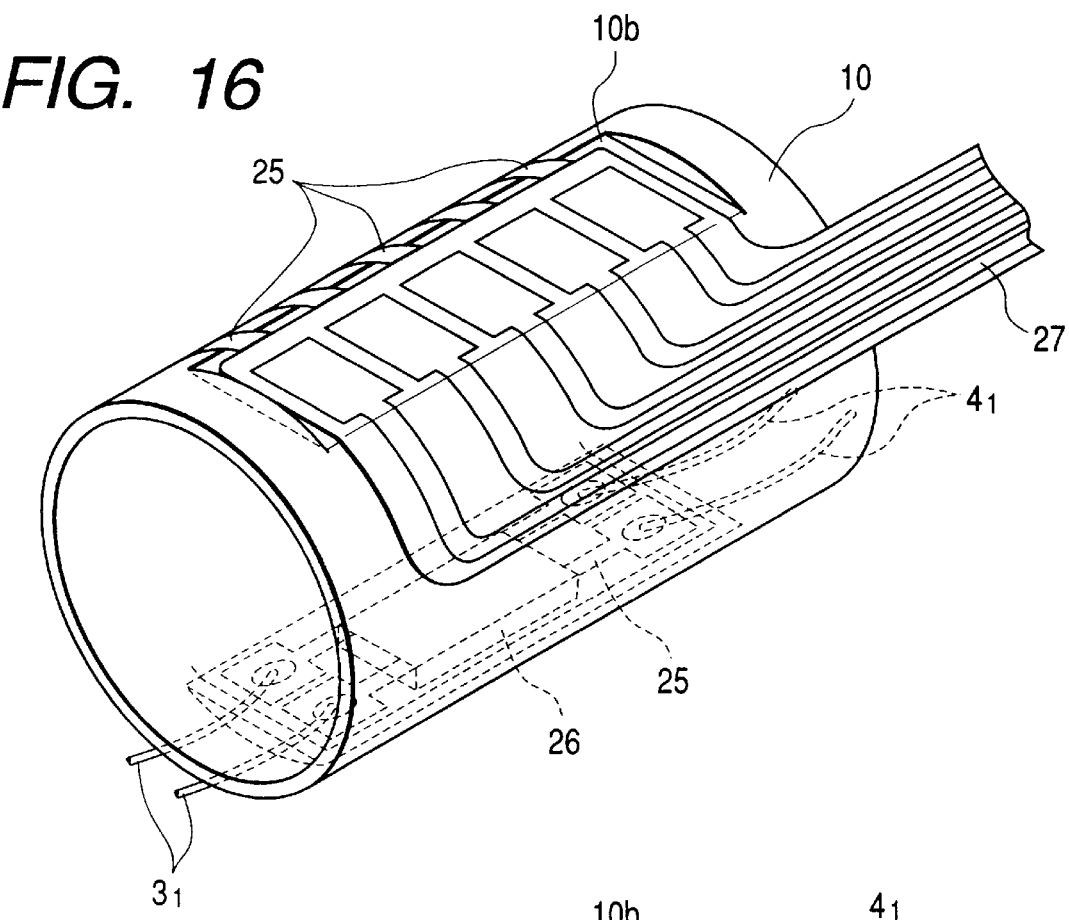
FIG. 16 shows in detail a connection ring shown in FIG. 15.
Figure 17:
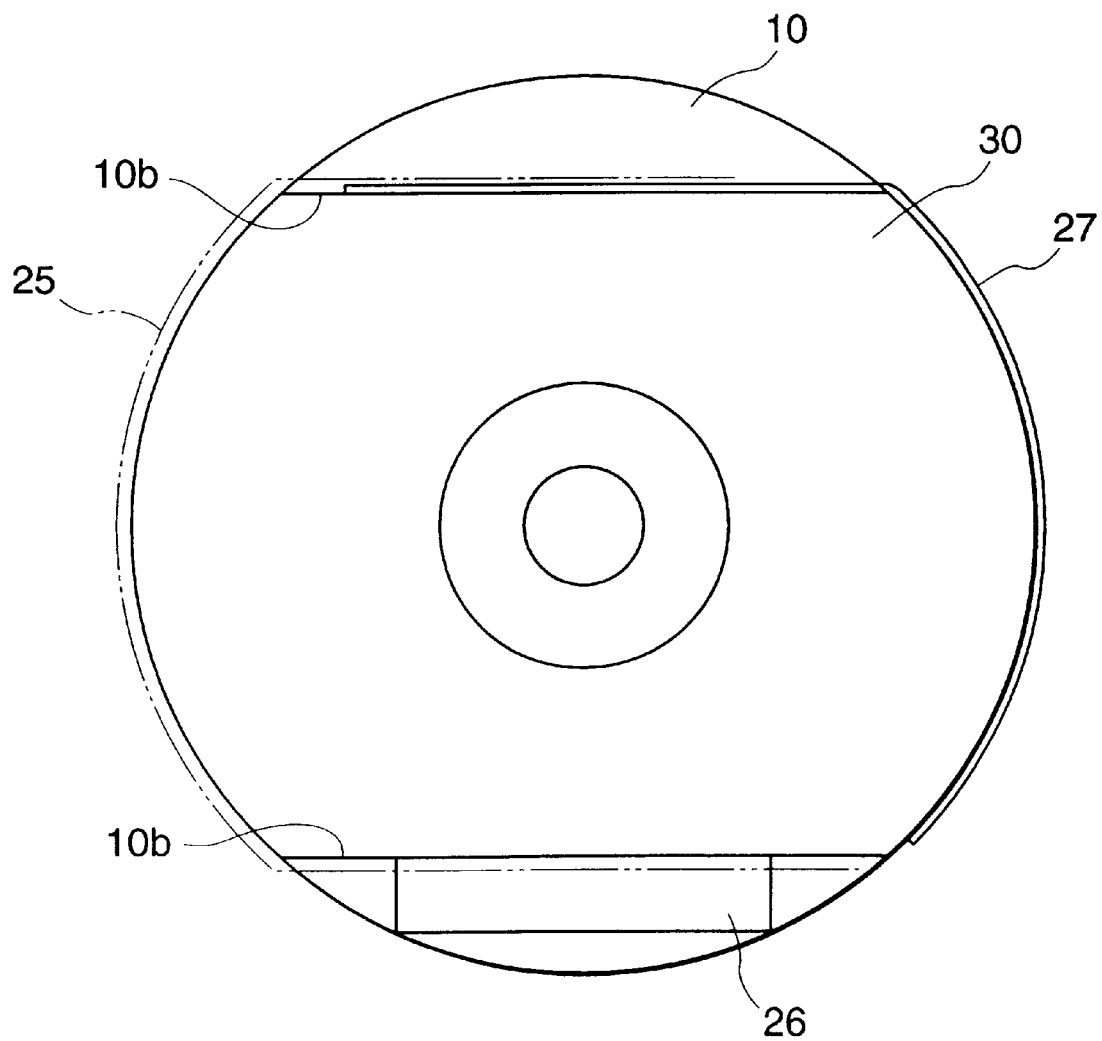
FIG. 17 is a cross-sectional view of the motor shown in FIG. 15.

FIG. 16 shows in detail the connection ring shown in FIG. 15, and FIG. 17 is a cross-sectional view of the motor shown in FIG. 15.

Referring to FIG. 16, the terminal portions $3_1$ and $4_1$ extending from the respective coils 3 and 4 are laser-welded on an M.I.D. circuit pattern 25 formed on the connection ring 10, and an IC chip 26 is mounted on the M.I.D. circuit pattern 25 by a known stand bump method or solder bump method. The circuit pattern 25 formed on the connection ring 10 is connected to the upper flat portion 10b through the rear surface in FIG. 16 of the connection ring 10, and is then connected to a connecting flexible printed circuit 27 by laser welding or the like. The connecting flexible printed circuit 27 is fixed to the side surface of the connection ring 10, partly constituting the motor, with a double-coated tape or the like. The other end portion (not shown) of the connecting flexible printed circuit 27 is connected to a control circuit portion, e.g., an IC or a microcomputer, of equipment incorporating this motor with a known means.

FIG. 17 is a sectional view taken at substantially the central portion of the motor unit shown in FIG. 16 along a surface perpendicular to the axis of the output shaft (rotating shaft) of the motor. A motor unit 30 (particularly only its outline) has been explained so far. The flat portions 10b of the connection ring 10 of the motor unit 30 are shown in FIG. 17. In FIG. 17, the circuit chip 26 described above is mounted on the lower flat portion 10b, on which the M.I.D. circuit pattern 25 indicated by an alternate long and two short dashed line is formed, by bump soldering. In the upper flat portion 10b, the connecting portion of the M.I.D. circuit pattern 25 and the connecting portion of the connecting flexible printed circuit 27 are connected to each other by laser welding or the like. When this structure is observed closely, the unit including all the mounted components is located inside the circular silhouette (the interior of the circular outline obtained when the motor is seen in the axial direction of the output shaft) of the motor 30. This provides a very compact arrangement when considering mounting of the motor on an equipment or the like.

Figure 18:
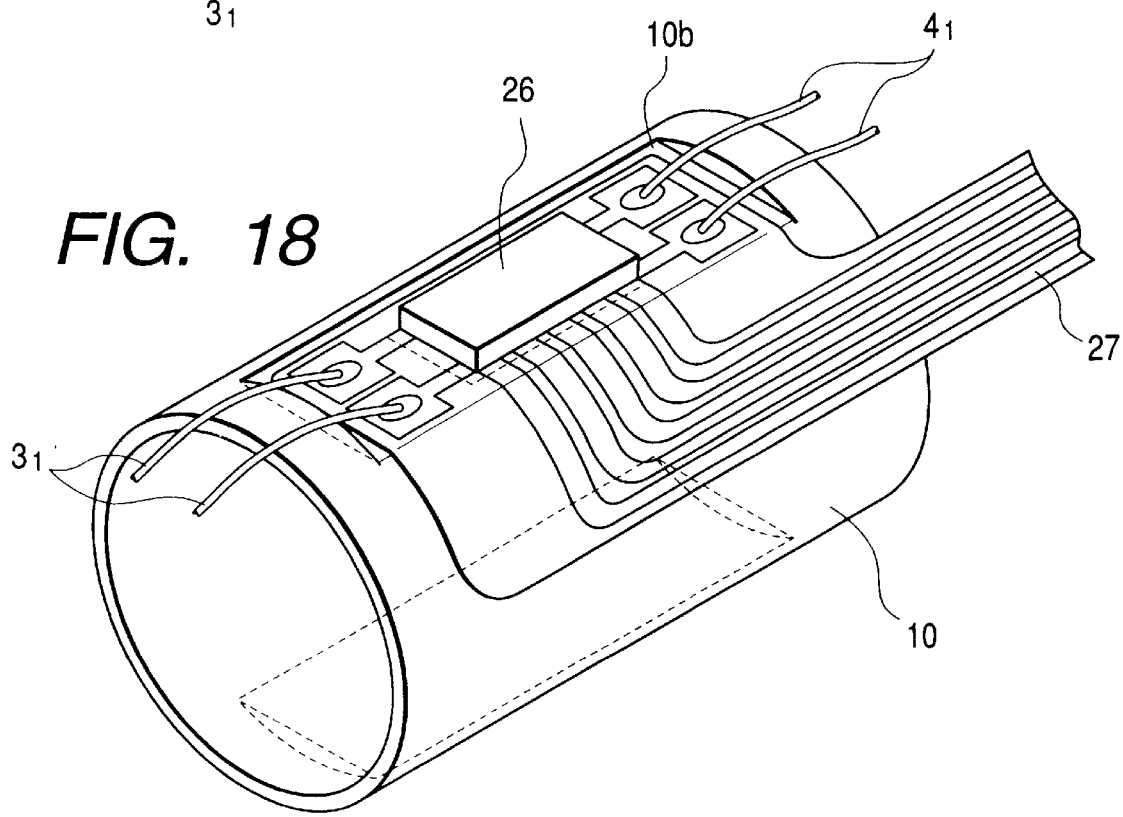
FIG. 18 shows in detail another example of the connection ring shown in FIG. 15.

FIG. 18 shows another example of the connection ring shown in FIG. 15. Referring to FIG. 18, the connection ring includes coil terminals $3_1$ and $4_1$, a connection ring 10, a flat portion 10b of the connection ring 10, a circuit chip 26, and a connecting flexible printed circuit 27. The purpose of this example is also to house the motor unit inside the silhouette of the motor. For this purpose, the M.I.D. technique is employed in the above embodiment. In FIG. 18, the circuit chip is directly mounted on the connecting flexible printed circuit, which is set on the connection ring with, e.g., a double-coated tape.

Figure 19:
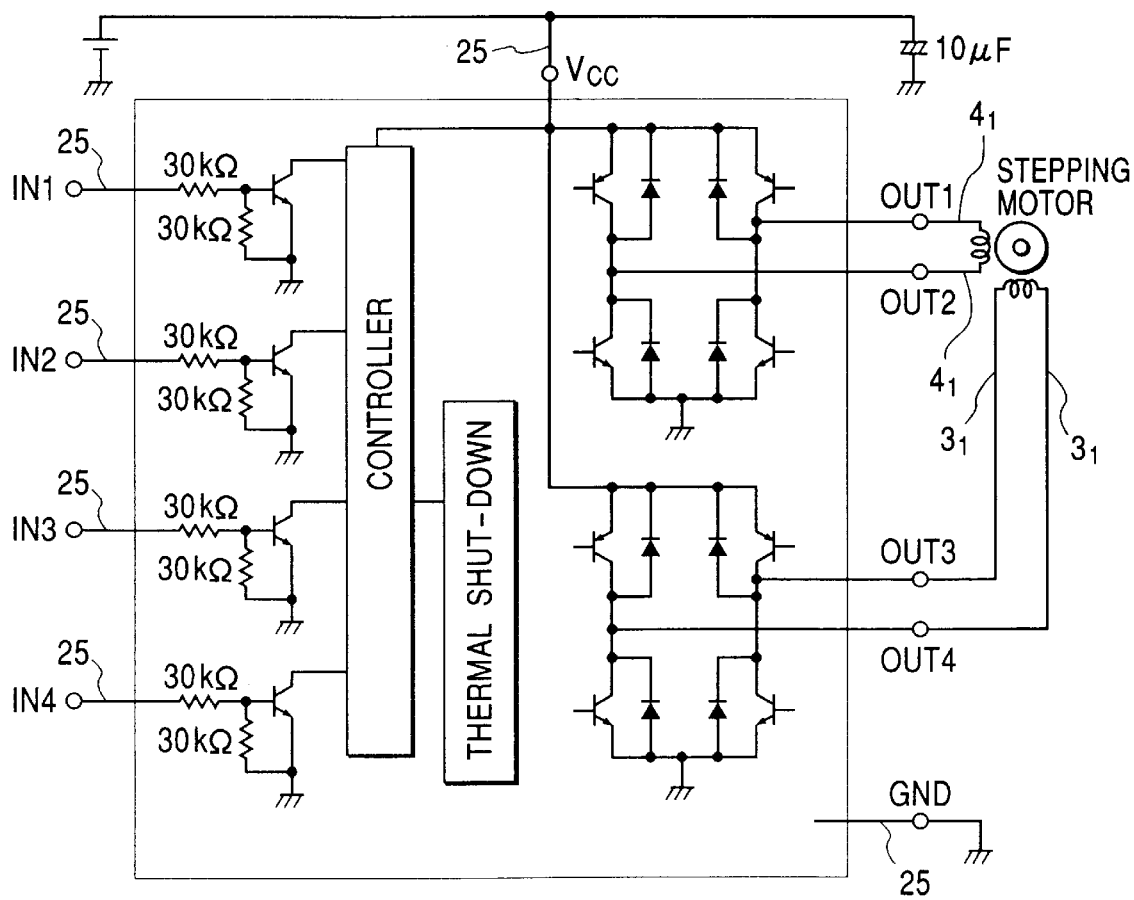
FIG. 19 is a circuit diagram of a circuit chip shown in FIGS. 15 and 18.
Figure 20:
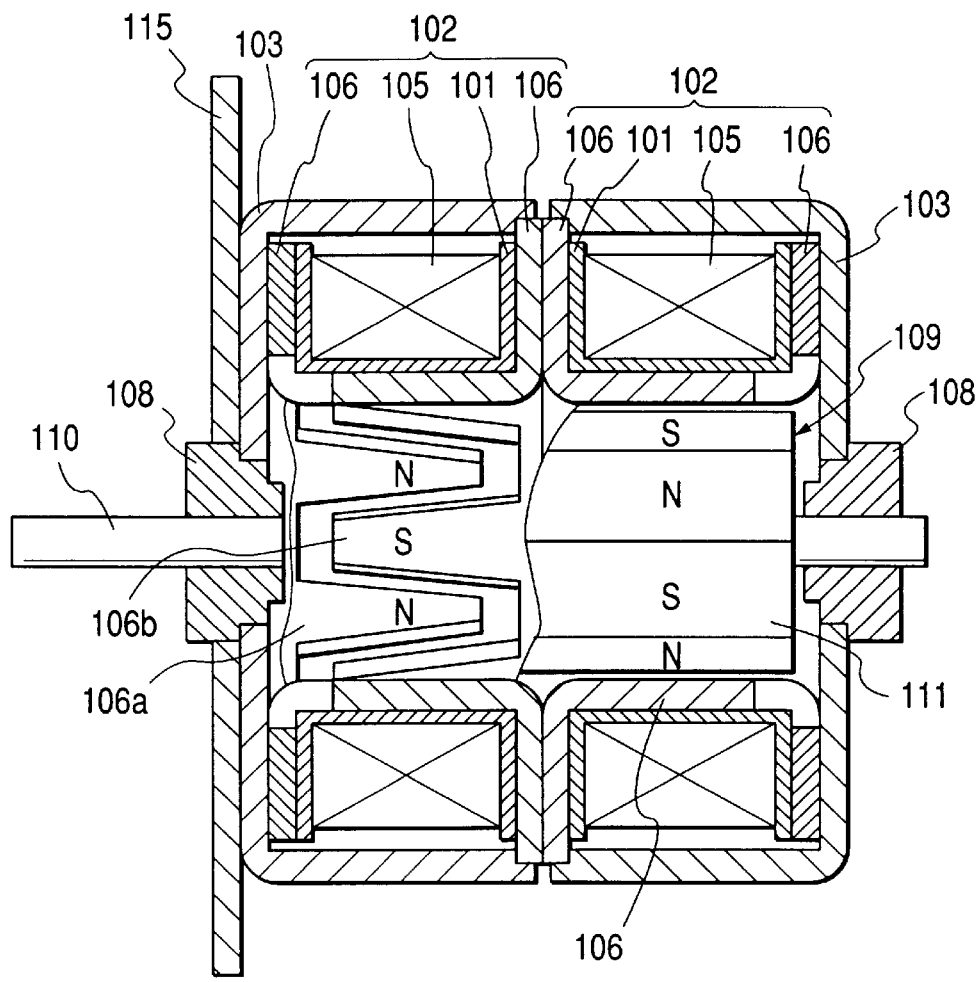
FIG. 20 is a sectional view showing a conventional stepping motor.
Figure 21:
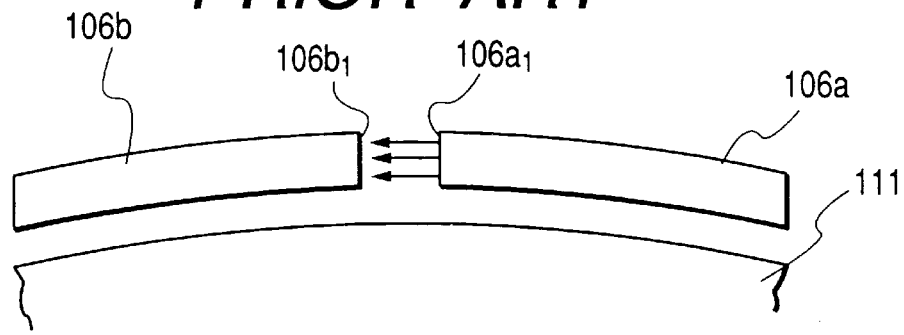
FIG. 21 is a view for explaining the magnetic flux of the conventional stepping motor shown in FIG. 20.

FIG. 19 shows an example of the circuit chip shown in FIGS. 16 and 18. This circuit chip is a motor driver commercially available as a model LB1846M from Sanyo Electric Co., Ltd. In FIG. 19, lead wires extending from the microcomputer to control terminals to be controlled, a lead wire extending to the connection terminal of the power supply, and a lead wire extending to the connection terminal to ground are denoted by reference numerals 25, and lead wires extending to the motor windings are denoted by reference numerals $3_1$ and $4_1$. The circuit chip incorporates an MR element and a switching circuit, so that the phases of the respective output terminals sequentially switch automatically.

As has been described above, according to the present invention, a small-diameter, high-output motor which can be manufactured easily and is integrally formed with an electric element can be obtained, so that a motor unit having good rotor position detection precision can be provided. According to the present invention, a driver circuit and a control circuit can be incorporated inside the silhouette of the motor, so that a very compact motor unit can be obtained.

In the above embodiments, the outer circumferential surface of the permanent magnet constituting the rotor is divided into n portions in the circumferential direction to be magnetized to S and N poles, and the inner circumferential surface of the permanent magnet is also divided into n portions in the circumferential direction to be magnetized to S and N poles. The inner circumferential surface is magnetized to poles different from those of the adjacent outer circumferential surface. The present invention is not limited to this, and only the outer circumferential surface of the permanent magnet may be divided into n portions in the circumferential direction to be magnetized to S and N poles.

Furthermore, in the above embodiments, the number of magnetized poles of the permanent magnet is four. However, the present invention is not limited to this, and the number of magnetized poles of the permanent magnet may be equal to or larger than four. In the latter case, the number of poles of the outer and inner magnetic poles may be increased accordingly.

What is claimed is:

1. A motor comprising:

a magnet formed into a cylindrical shape and having at least an outer circumferential surface divided into n portions in a circumferential direction to be alternately magnetized to different poles;

first and second coils arranged in an axial direction of said magnet, said first and second coils being arranged to sandwich said magnet;

a first outer magnetic pole excited by said first coil, said first outer magnetic pole opposing said outer circumferential surface, closed to one end, of said magnet;

a first inner magnetic pole excited by said first coil, said first inner magnetic pole opposing an inner circumferential portion, close to one end, of said magnet;

a second outer magnetic pole excited by said second coil, said second outer magnetic pole opposing said outer circumferential surface, close to the other end, of said magnet;

a second inner magnetic pole excited by said second coil, said second inner magnetic pole opposing an inner circumferential portion, close to the other end, of said magnet; and an electric element not covered with said first and second outer magnetic poles and arranged to oppose said circumferential surface of said magnet across a predetermined gap, said electric element serving to detect a position of said magnet.

2. A motor according to claim 1, wherein said magnet has a first magnetized layer having at least an inner circumferential surface divided into n portions in the circumferential direction to be alternately magnetized to different poles, and a second magnetized layer adjacent to said first magnetized layer in an axial direction and having at least an outer circumferential surface divided into n portions in the circumferential direction to be alternately magnetized to different poles, said second magnetized layer by 180/n°, and wherein said electric element is located to oppose at least one of said first and second magnetized layer.

3. A motor according to claim 1, wherein said inner circumferential surface of said magnet is divided into n portions in the circumferential direction to be alternately magnetized to different poles that are different from said poles of said outer circumferential surface adjacent to said inner circumferential surface.

4. A motor according to claim 1, wherein said first inner magnetic pole is formed as a first yoke, said second inner magnetic pole is formed as a second yoke, and said first and second outer magnetic poles form a third yoke, said third yoke having a notched hole forming an outer magnetic pole, and said electric element being arranged in said notched hole.

5. A motor according to claim 1, wherein said first inner magnetic pole is formed as a first yoke, said second inner magnetic pole is formed as a second yoke, said first outer magnetic pole is formed as a third yoke, and said second outer magnetic pole is formed as a fourth yoke, said first and third yokes forming a first stator, said second and fourth yokes forming a second stator, said third and fourth yokes being connected to each other with a cylindrical connecting member, and said electric element being fixed to said connecting member.

6. A motor comprising:

a magnet ring made of a permanent magnet, formed into a cylindrical shape, and having a first magnetized layer and a second magnetized layer, said first magnetized layer being divided into n portions in a circumferential direction to be alternately magnetized to different poles, and said second magnetized layer being adjacent to said first magnetized layer in an axial direction and divided into n portions in the cicumferential direction to be alternately magnetized to different poles, and said second magnetized layer being phase-shifted from said first magnetized layer by 180/n°;

a rotor to which said magnet ring is fixed, and first and second coils concentric with said rotor and arranged at positions to sandwich said magnet ring in an axial direction;

a cylinldrical first yoke inserted in an inner-diameter portion of said first coil and opposing an inner-diameter portion of said first magnetized layer of said magnet ring across a gap, said first yoke being made of a soft magnetic material;

a cylindrical second yoke inserted in an inner-diameter portion of said second coil and opposing an inner-diameter portion of said second magnetized layer of said magnet ring across a gap, said second yoke being made of a soft magnetic material;

a third yoke covering said first and second coils and a predetermined angular range of an outer-diameter portion of said magnet ring, said third yoke being made of a soft magnetic material; and an electric element arranged at a position to oppose a circumferential surface of said magnet ring not covered with said third yoke across a predetermined gap.

7. A motor according to claim 6, wherein said electric element is arranged at either one of a position opposing, across a predetermined gap, said circumferential surface of said magnet ring not covered with said third yoke and having said first magnetized layer, and a position opposing, across a predetermined gap, said circumferential surface of said magnet ring having said second magnetized ring, alternatively, and wherein two electric elements are arranged side by side at positions opposing, across a predetermined gap, circumferential surfaces of two magnet rings respectively having first and second magnetized layers.

8. A motor according to claim 7, wherein one of said two electric elements is arranged at either one of a position opposing, across a predetermined gap, said circumferential surface of said magnet ring not covered with said third yoke and having said first magnetized layer, and a position opposing across a predetermined gap, said circumferential surface of said magnet ring having said second magnetized layer, and the other one of said two electric elements is arranged on a corner opposing said first electric element through 180° about a rotor shaft as a center, to oppose, across a predetermined gap, said circumferential surface of said magnet ring having a magnetized layer which is not covered with said third yoke and on which said first electric element is not arranged.

9. A motor comprising:

a magnet ring constituted by a cylindrical permanent magnet equally divided in a circumferential direction to be alternately magnetized to different poles;

a rotor to which said magnetic ring is fixed;

first and second coils concentric with said rotor and arranged at positions to sandwich said magnet ring in an axial direction;

a cylindrical first yoke inserted in an inner-diameter portion of said first coil and opposing an inner-diameter portion of a first magnetized layer of said magnet ring across a gap, said first yoke being made of a soft magnetic material;

a cylindrical second yoke inserted in an inner-diameter portion of said second coil and opposing au inner-diameter portion of a second magnetized layer of said magnet ring across a gap, said second yoke being made of a soft magnetic material;

a fourth yoke having a magnetic pole portion with one end connected to said first yoke and covering an outer-diameter portion of said first coil, and the other end opposing a predetermined angular range of an outer-diameter portion of said magnet ring;

a fifth yoke having a magnetic pole portion with one end connected to said second yoke and covering an outer-diameter portion of said second coil, and the other end opposing a predetermined angular range of said outer-diameter portion of said magnet ring;

a connecting member for concentrically holding said fourth and fifth yokes and made of a nonmagnetic material; and an electric element arranged at a position to oppose, across a predetermined gap, said circumferential surface of said magnet ring which is not covered with said fourth and fifth yokes.

10. A motor according to claim 9, wherein said electric element is arranged at either one of a position opposing, across a predetermined gap, said circumferential surface of said magnet ring not covered with said fourth yoke, and a position opposing, across a predetermined gap, said circumferential surface of said magnet ring not covered with said fifth yoke, alternatively, wherein two electric elements are arranged side by side at positions opposing, across a predetermined gap, said circumferential surface of said magnet ring not covered with both of said fourth and fifth yokes.

11. A motor according to claim 10, wherein one of said two electric elements is arranged at either one of a position opposing, across a predetermined gap, said circumferential surface of said magnet ring not covered with said fourth yoke, and a position opposing, across a predetermined gap, said circumferential surface of said magnet ring not covered with said fifth yoke, and the other one of said two electric elements is arranged an a corner opposing said first electric element through 180° about a rotor shaft as a center, to oppose, across a predetermined gap, said circumferential surface of said magnet ring on which said first electric element is not arranged and which is not covered with a yoke.

12. A motor according to any one of claims 6 and 9, wherein said electric element is a Hall IC, a Hall element, or an MR element.

13. A motor according to any one of claims 6 and 9, wherein said electric element is housed and arranged between a coil terminal of said first coil and a coil terminal of said second coil.

14. A motor comprising:

a magnet formed into a cylindrical shape and having at least an outer circumferential surface divided into n potion in a circumferential direction to be alternately magnetized to different poles;

first and second coils arranged in an axial direction of said magnet, said first and second coils being arranged to sandwich said magnet;

a first yoke inserted in an inner-diameter portion of said first coil and opposing an inner-diameter portion of said magnet across a gap;

a second yoke inserted in an inner-diameter portion of said second coil and opposing said inner-diameter portion of sad magnet across a gap;

a third yoke having one end connected to said first yoke and covering an outer-diameter portion of said first coil, and the other end opposing an outer-diameter portion of said magnet across a gap;

a fourth yoke having one end connected to said second yoke and covering an outer-diameter portion of said second coil, and the other end opposing said outer-diameter portion of said magnet across a gap; and a connecting member for holding said third and fourth yokes to form a casing of said motor, said connecting member being formed with a circuit pattern, and said circuit pattern being connected to a wiring in said motor.

15. A motor according to claim 14, wherein said circuit pattern is formed with a connecting portion for connecting said motor to an external circuit.

16. A motor according to claim 14, wherein an IC chip of a driver circuit is mounted on said circuit pattern.

17. A motor according to claim 16, wherein said IC chip is mounted in a Chip Size or Scale Package.

18. A motor according to claim 16, wherein said connection member is substantially cylindrical and has at least one flat portion on a cylindrical outer circumferential portion thereof, and an IC chip is mounted on said flat portion.

19. A motor according to claim 14, wherein said circuit pattern is constituted by an M.I.D.

20. A motor according to claim 14, wherein said circuit pattern is constituted by a flexible printed circuit.

21. A motor according to claim 14, wherein a portion of said circuit pattern which is to be connected to an outside is formed on a certain surface of said motor, and a motor wiring is connected to or an IC chip is mounted on at least another surface of said motor.

22. A motor according to claim 14, wherein said casing of said motor is made of a super engineering plastic.

23. A motor according to claim 14, wherein said motor is a brushless motor.

24. A motor comprising:

a magnet axially rotatably supported;

winding coils on two sides of said magnet which are arranged to oppose each other to sandwich said magnet in an axial direction of an output shaft;

cylindrical inner yoke portions on two sides of said magnet which are arranged inside said winding coils on two sides;

cylindrical outer yoke portions on two sides of said magnet which are arranged outside said winding coils on two sides; and a substantially cylindrical connection ring for connecting said outer yoke portions on two sides, said connection ring being formed with at least one flat portion on an outer circumference thereof, said flat portion being formed with a circuit pattern, and said circuit pattern being connected to an outside or an IC chip of a driver circuit being mounted on said circuit pattern.

25. A motor according to claim 24, wherein said connection ring is formed with two flat portions, and said flat portions are formed with circuit patterns connected to each other, one of said circuit patterns being connected to an outside while an IC chip being mounted on the other of said circuit patterns.

26. A motor according to claim 24, wherein said connection ring is formed with at least one flat portion, and said flat portion is formed with a circuit pattern, said circuit pattern being connected to an outside, and an IC chip being mounted on said circuit pattern.

* * * * *

UNITED STATES PATENT AND TRADEMARK OFFICE
CERTIFICATE OF CORRECTION

PATENT NO. : 5,945,753

DATED : August 31, 1999

INVENTOR(S): HIROAKI MAEGAWA, ET AL.

It is certified that error appears in the above-identified patent and that said Letters Patent is hereby corrected as shown below:

COLUMN 2,
Line 1, "cation" should read --cation,--.

COLUMN 11,
Line 22, "au" should read --an--.
Line 65, "an" should read --on--.

COLUMN 12,
Line 14, "potion" should read --portions--.

Signed and Sealed this

Fourth Day of July, 2000

Attest:

Q. TODD DICKINSON

Attesting Officer     Director of Patents and Trademarks